(12) United States Patent
Cho et al.

(10) Patent No.: US 12,346,279 B2
(45) Date of Patent: Jul. 1, 2025

(54) SEMICONDUCTOR DEVICE AND SYSTEM INCLUDING THE SAME

(71) Applicant: SAMSUNG ELECTRONICS CO., LTD., Suwon-si (KR)

(72) Inventors: Jaeho Cho, Seoul (KR); Sunho Ki, Suwon-si (KR); Wangseok Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 294 days.

(21) Appl. No.: 18/056,790

(22) Filed: Nov. 18, 2022

(65) Prior Publication Data
US 2023/0176989 A1 Jun. 8, 2023

(30) Foreign Application Priority Data
Dec. 2, 2021 (KR) .................. 10-2021-0170631

(51) Int. Cl.
*G06F 13/40* (2006.01)
*G06F 13/42* (2006.01)
(52) U.S. Cl.
CPC ...... *G06F 13/4027* (2013.01); *G06F 13/4221* (2013.01)
(58) Field of Classification Search
CPC .................. G06F 13/4027; G06F 13/4221
See application file for complete search history.

(56) References Cited

U.S. PATENT DOCUMENTS

| | | | |
|---|---|---|---|
| 6,185,712 B1 | 2/2001 | Kirihata et al. | |
| 7,437,643 B2 | 10/2008 | Khanna et al. | |
| 9,203,594 B2 | 12/2015 | Diab et al. | |
| 10,504,606 B2 | 12/2019 | Kwon et al. | |
| 10,698,856 B1 | 6/2020 | Caruk et al. | |
| 10,713,209 B2 | 7/2020 | Jen et al. | |
| 2002/0056060 A1 | 5/2002 | Saruhashi et al. | |
| 2012/0059957 A1* | 3/2012 | Millsaps ................. | H04L 49/35 710/316 |

(Continued)

FOREIGN PATENT DOCUMENTS

CN   110069370   7/2019

OTHER PUBLICATIONS

Francisco E. Rangel-Patino, et al., "High-Speed Links Receiver Optimization in Post-Silicon Validation Exploiting Broyden-based Input Space Mapping", 2018 IEEE MTT-S International Conference on Numerical Electromagnetic and Multiphysics Modeling and Optimization (NEMO).

*Primary Examiner* — Nimesh G Patel
(74) *Attorney, Agent, or Firm* — MORGAN, LEWIS & BOCKIUS LLP

(57) ABSTRACT

A semiconductor device includes: a plurality of ports exchanging data with each other in an interface; and an interface controller including a link training and status state machine (LTSSM), configured to execute link-up, setting a plurality of lanes to the plurality of ports, and a memory configured to store a sequence, in which the LTSSM succeeding in the link-up executes states, as a reference sequence. The interface controller changes at least one of the PHY parameters when a calibration operation of adjusting the PHY parameters starts until a sequence of the states, executed by the LTSSM to complete the link-up, matches the reference sequence.

20 Claims, 17 Drawing Sheets

(56) References Cited

U.S. PATENT DOCUMENTS

| | | | | |
|---|---|---|---|---|
| 2014/0019742 A1* | 1/2014 | Ma | ................... | G06F 13/4027 |
| | | | | 713/100 |
| 2019/0303342 A1* | 10/2019 | Jen | ................... | G06F 13/4221 |
| 2020/0192850 A1* | 6/2020 | Caruk | ................... | G06F 13/22 |
| 2022/0382692 A1* | 12/2022 | Jeon | ................... | G06F 11/0772 |
| 2022/0382696 A1* | 12/2022 | Jeon | ................... | G06F 13/4221 |
| 2024/0241569 A1* | 7/2024 | Tung | ................... | G06F 1/3296 |

\* cited by examiner

SEMICONDUCTOR DEVICE AND SYSTEM INCLUDING THE SAME

CROSS-REFERENCE

This application claims priority under 35 U.S.C. § 119 to Korean Patent Application No. 10-2021-0170631 filed on Dec. 2, 2021 in the Korean Intellectual Property Office, the disclosure of which is incorporated by reference in its entirety.

FIELD

The present disclosure relates to a semiconductor device and a system including the same.

DISCUSSION

A semiconductor device may include an interface for exchanging data with another external device, and the interface may be implemented to comply with various standards. Among interfaces connecting semiconductor devices to each other, a Peripheral Component Interconnect Express (PCIe) interface has been applied to various fields for high-speed data transmissions. As a type of serial data transmission interface, a PCIe interface is defined by PCIe specifications and provides a bidirectional connection used to simultaneously transmit and receive data. In order for semiconductor devices to exchange data with each other using a PCIe interface, processes may be executed for setting a link in a physical layer (PHY) of the PCIe interface, selecting a value of PHY parameters which may be set in the physical layer, and the like.

SUMMARY

Some embodiments of the present disclosure may provide a semiconductor device which may exchange data with an external device under variable conditions by implementing a calibration operation in the form of built-in self-calibration (BISC) to adjust physical layer (PHY) parameters in the semiconductor device, and exchanging data through a PCIe interface. Other embodiments of the present disclosure may provide a system including the same. According to an embodiment of the present disclosure, a semiconductor device includes: ports configured for exchanging data with each other in an interface; and an interface controller including a link training and status state machine (LTSSM), configured to execute link-up, setting lanes to the ports, and a memory configured to store a sequence, in which the LTSSM succeeding in the link-up executes states, as a reference sequence, where the interface controller changes at least one of the PHY parameters when a calibration operation of adjusting the PHY parameters starts until a sequence of the states, executed by the LTSSM to complete the link-up, matches the reference sequence.

According to an embodiment, a semiconductor device includes: a plurality of ports exchanging data with each other in a Peripheral Component Interconnect Express (PCIe) interface; and a PCIe controller including a LTSSM, configured to execute link-up, setting a plurality of lanes to the plurality of ports, and a memory configured to store a sequence, in which the LTSSM succeeding in the link-up executes states, as a reference sequence. The PCIe controller changes at least one of the PHY parameters when a calibration operation of adjusting the PHY parameters starts until a sequence of the states, executed by the LTSSM to complete the link-up, matches the reference sequence.

According to an embodiment of the present disclosure, a semiconductor device includes: ports exchanging data with each other under an interface environment; and an interface controller including a LTSSM, configured to execute link-up setting lanes to the ports, and a memory configured to store a sequence, in which the LTSSM succeeding in the link-up executes states, as a reference sequence, where: the interface controller changes at least one PHY parameter, among PHY parameters determining characteristics of signals input to the ports and output from the ports, at each of a first time point and a second time point subsequent to an operation start time point at which the ports are connected to an external device and receive power.

According to an embodiment, a semiconductor device includes: a plurality of ports exchanging data with each other under a PCI express (PCIe) environment; and a PCIe controller including a link training and status state machine (LTSSM), configured to execute link-up setting a plurality of lanes to the plurality of ports, and a memory configured to store a sequence, in which the LTSSM succeeding in the link-up executes states, as a reference sequence. The PCIe controller changes at least one PHY parameter, among PHY parameters determining characteristics of signal input to the plurality of ports and output from the plurality of ports, at each of a first time point and a second time point subsequent to an operation start time point at which the plurality of ports are connected to an external device and receive power.

According to an embodiment of the present disclosure, a system includes: a first semiconductor device including a first interface and a first interface controller configured to control the first interface; a second semiconductor device including a second interface and a second interface controller configured to control the second interface; and a third semiconductor device including a third interface, connected to the first interface, and a fourth interface connected to the second interface, where: the first interface controller changes at least one PHY parameter, among PHY parameters of the first interface, at a first time point and reconfigures a link between the first interface and the third interface; and the second interface controller changes at least one PHY parameter, among PHY parameters of the second interface, at a second time point, different from the first time point, and reconfigures a link between the second interface and the fourth interface.

According to an embodiment, a system includes: a first semiconductor device including a first PCIe interface and a first PCIe controller configured to control the first PCIe interface; a second semiconductor device including a second PCIe interface and a second PCIe controller configured to control the second PCIe interface; and a third semiconductor device including a first interface, connected to the first PCIe interface, and a second interface connected to the second PCIe interface. The first PCIe controller changes at least one PHY parameters, among PHY parameters of the first PCIe interface, at a first time point and reconfigures a link between the first PCIe interface and the first interface. The second PCIe controller changes at least one PHY parameters, among PHY parameters of the second PCIe interface, at a second time point, different from the first time point, and reconfigures a link between the second PCIe interface and the second interface.

BRIEF DESCRIPTION OF DRAWINGS

The above and other embodiments of the present disclosure will be more clearly understood from the following detailed description when taken in conjunction with the accompanying drawings, in which.

DETAILED DESCRIPTION

The present disclosure is provided by way of example, without limitation thereto. Hereinafter, embodiments of the present disclosure will be described with reference to the accompanying drawings.

Figure 1:
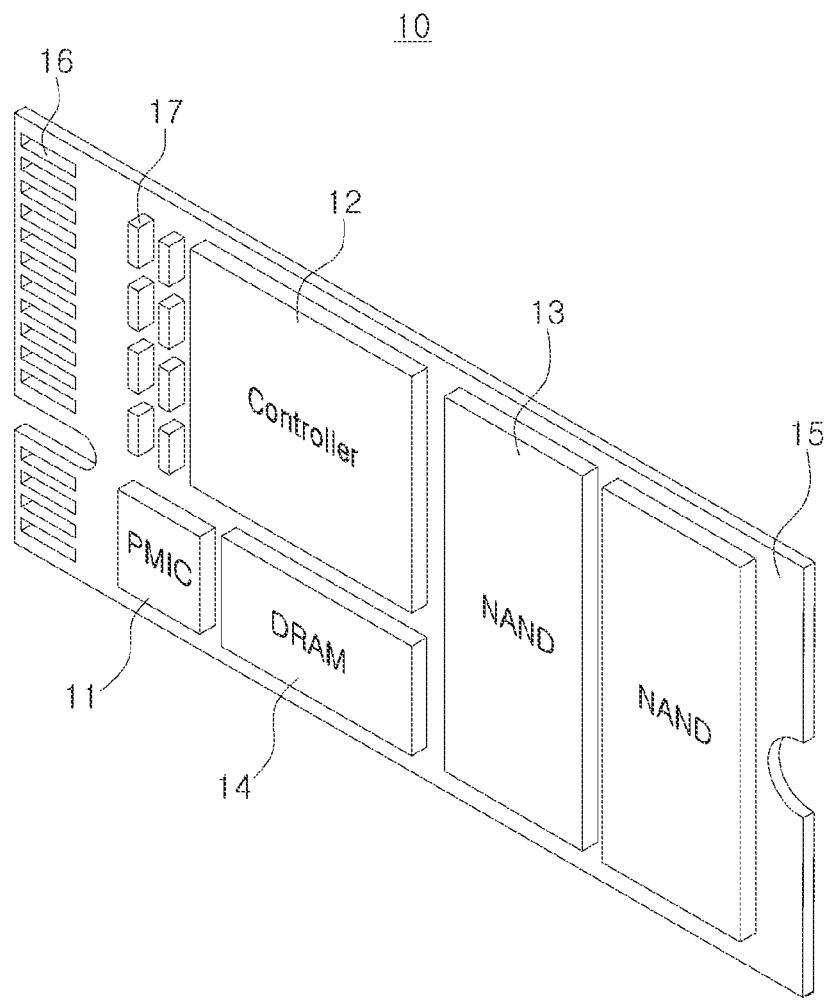
FIG. 1 is a schematic diagram illustrating a storage device including a semiconductor device according to an embodiment.

FIG. 1 illustrates a storage device including a semiconductor device according to an embodiment. A storage device 10 may have a form factor complying with an M.2 standard, and may communicate with an external host, for example, a central processing unit (CPU), a system-on-chip, an application processor, or the like, according to a Peripheral Component Interconnect Express (PCIe) interface protocol.

The storage device 10 may include a power supply circuit 11, a controller 12, memory devices 13, a dynamic random-access memory (DRAM) 14, a system substrate 15, and the like. The power supply circuit 11 may include a power management integrated circuit (PMIC). The power supply circuit 11, the controller 12, and the memory devices 13 may be electrically connected to each other by interconnection patterns formed on the system substrate 15. One or more integrated circuits 17 may be further mounted on the system substrate 15.

The system substrate 15 may include a connector 16 including a plurality of ports, which may be coupled to an external host. The plurality of ports, included in the connector 16, may be connected to the power supply circuit 11, the controller 12, and the like. As an example, the power supply circuit 11 may be connected to power supply pins among the plurality of ports, receive power from an external device, and generate internal power supply voltages required for operations of the controller 12, the memory devices 13, the DRAM 14, and the like. According to an embodiment, the power supply circuit 11 may include a distribution circuit supplying internal power voltages output by the PMIC to the controller 12, the memory devices 13, the DRAM 14, and the like.

The controller 12 may write data to or read data from the memory devices 13, and may exchange data with an external device, for example, a host. The memory devices 13 may include a plurality of memory devices separated from each other, and each of the plurality of memory devices may include one or more memory chips. The memory chips may be NAND memory chips, and the controller 12 may include a NAND controller controlling the NAND memory chips, a memory interface, and the like.

The DRAM 14 may operate as a buffer memory capable of supporting a difference in speed between the memory devices 13, data storage spaces, and a host or external device. The DRAM 14 included in the storage device 10 may operate as a type of cache memory, and may provide a space in which data is temporarily stored in a control operation for the memory devices 13. The controller 12 may further include a DRAM controller controlling the DRAM 14, in addition to the NAND controller controlling the memory devices 13 including NAND memory chips.

In the embodiment illustrated in FIG. 1, the controller 12 may include a PCIe controller configuring a link according to an external host and a PCIe interface. The PCIe controller may configure data lanes for exchange of data, clock lanes for receiving a clock signal, and power supply lanes for receiving a power supply voltage to the plurality of ports included in the connector 16.

In addition, the PCIe controller may perform a link-up process in which values of physical layer (PHY) parameters configurable in a physical layer are determined, to configure a link between the external host and the storage device 10. As an example, the PCIe controller may include a link training and status state machine (LTSSM) representing various states of the link. Based on the LTSSM, a link width, a data rate, a lane number, polarity of lane, a boundary between consecutive bits, and the like, may be determined.

In an embodiment, an order, in which the LTSSM succeeding in link-up executes states, may be stored in a memory in the PCIe controller as a reference order. When a calibration operation is performed to adjust the PHY parameters, the PCIe controller may change at least one of the PHY parameters and may then compare the order of the states, executed by the LTSSM, with the reference order to complete the link-up. The PCIe controller may adjust the PHY parameters to complete the link-up until the order of the states, executed by the LTSSM, matches the reference order. Accordingly, the PHY parameters may be adjusted to exchange data under variable environments or conditions.

Figure 2:
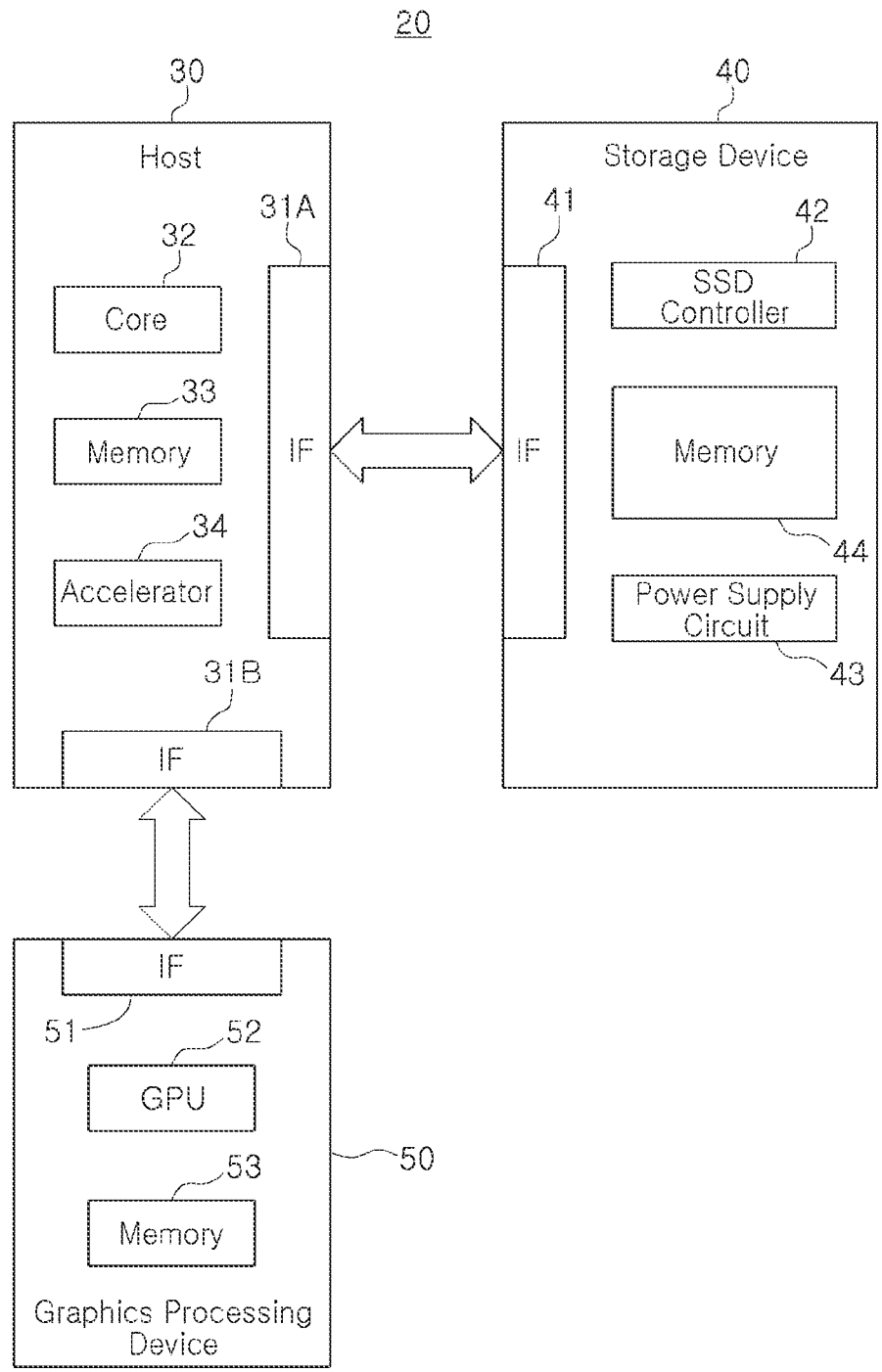
FIG. 2 is a block diagram illustrating a system including a semiconductor device according to an embodiment.

FIG. 2 illustrates a system including a semiconductor device according to an embodiment.

Referring to FIG. 2, a system 20, according to an embodiment, may include a host 30, a storage device 40, a graphics processing device 50, and the like. The host 30 may control the storage device 40 to store data in the storage device 40 or to read data stored in the storage device 40. Also, the host 30 may exchange graphics data with the graphic processing device 50. The host 30 may be a device such as a central processing unit (CPU), an application processor (AP), a system-on-chip (SoC), or the like.

The host 30 may include a first interface 31A connected to the storage device 40, a second interface 31B connected to the graphics processing unit 50, a core 32 performing an operation, a memory 33, an accelerator 34, or the like. According to an embodiment, the host 30 may include two or more cores 32, and the memory 33 may be a cache memory in the host 30. The accelerator 34 may perform artificial intelligence (AI) data calculations, and the like.

The storage device 40 may include an interface 41, an SSD controller 42, a power supply circuit 43, a memory 44, and the like. The storage device 40 may operate in response to a control command received from the host 30 through the interface 41, and may receive data and store the received data in the memory 44 or may fetch data stored in the memory 44 and output the fetched data to the host 30. The control command may include address information, and the controller 42 may store data in at least one of a plurality of memory chips included in the memory 44 based on the address information or may rad data from at least one of the plurality of memory chips based on the address information.

The graphics processing device 50 may include an interface 51, a GPU 52, a memory 53, and the like. The GPU 52 may process graphic data received from the host 30, and the memory 53 may store graphic the data processed by the GPU 52. For example, the memory 53 may include a DRAM, a PRAM, an RRAM, an MRAM, or the like, having a high read/write speed.

In an embodiment, the first interface 31A of the host 30 and the interface 41 of the storage device 40 may exchange data through a PCIe or like interface, and the second interface 31B of the host 30 and the interface 51 of the graphic processing device 50 may exchange data through a PCIe or like interface. When the power of the system 20 is turned on and power is supplied to the host 30, the storage device 40, and the graphics processing device 50, a link-up process constituting links between the interfaces 31A to/from 41, and 31B to/from 51, may be performed to exchange data with each other. In the link-up process, a data rate, a voltage level, and a slew rate of a signal transmitting data, the number and polarity of data lanes, a lane number, and the like, may be determined.

In general, a link-up process may be performed based on PHY parameters having a predetermined value. However, a value of at least one of the PHY parameters for implementing an optimal configuration of data exchange may vary depending on the type of devices using a PCIe or like interface, an external temperature, a magnitude of power supplied to the system 20, and the like.

In general, a value of each PHY parameter is fixed before a device using a PCIe interface is shipped. Accordingly, when a device connected to the PCIe interface is changed or external temperature and power are changed, performance of the system 20 might otherwise deteriorate.

In an embodiment, at least one of the devices 30, 40 and/or 50 may support a built-in self-calibration (BICS) function allowing a PCIe controller to internally perform a calibration operation of changing PHY parameters. Accordingly, when the device connected to the PCIe interface is changed or the external temperature and/or power supply is changed, the PHY parameters and the link-up process may be re-performed as desired for the changed environment or conditions, and thus, the PCIe interface may be controlled in variable conditions and the performance of the system 20 may be optimized.

As an example, a calibration operation and a link-up process subsequent to the calibration operation may be internally performed by a PCIe controller of at least one of the host 30, the storage device 40, and the graphics processing device 50. In an embodiment, a first time point, at which the PCIe controller included in the storage device 40 performs a calibration operation to change at least one of the PHY parameters, may be different from a second time point at which the PCIe controller of the graphics processing device 50 performs a calibration operation. Conditions for executing the calibration operation, time intervals at which the calibration operation is performed, and the like, may be different from each other depending on the type of device, for example.

In addition, the PHY parameters changed by the PCIe controller of the storage device 40 at the first time point may be different from the PHY parameters changed by the PCIe controller of the graphics processing device 50 at the second time point. This may be because operating environments of the storage device 40 and the graphics processing device 50 may vary depending on the configuration of the system 20 and the usage amount of each of the storage device 40 and the graphics processing device 50. As an example, when the graphics processing device 50 is used relatively more after the system 20 is turned on, the internal temperature of the storage device 40 may be lower than the internal temperature of the graphics processing device 50. Accordingly, PHY parameters adjusted in a calibration operation for optimizing the PCIe interface may appear to be different in the storage device 40 and the graphics processing device 50.

Each of the storage device 40 and the graphics processing device 50 may store a reference sequence in a memory, or the like, in the PCIe controller. The reference sequence may include a sequence of states executed by an LTSSM until the PCIe controller succeeds in configuring a link using the LTSSM, as described above. As an example, the reference sequence of the storage device 40 may be different from the reference sequence of the graphics processing device 50.

When at least one of the PHY parameters is adjusted, the PCIe controller of each of the storage device 40 and the graphics processing device 50 may reconfigure a link using the LTSSM. The PCIe controller may compare a sequence of states, transitioned until the LTSSM reconfigures a link, with a reference sequence. When a result of the comparison with the reference sequence is determined not to match, the PCIe controller may repeatedly adjust the PHY parameters until the result of comparison with the reference sequence is determined to match each other. Since the reference sequences in the storage device 40 and the graphic processing unit 50 may be different from each other, time required for the storage device 40 to perform a calibration operation and to reconfigure a link of the PCIe interface may be different from time required for the graphics processing device 50 to perform a calibration operation and to reconfigure a link of the PCIe interface.

Figure 3:
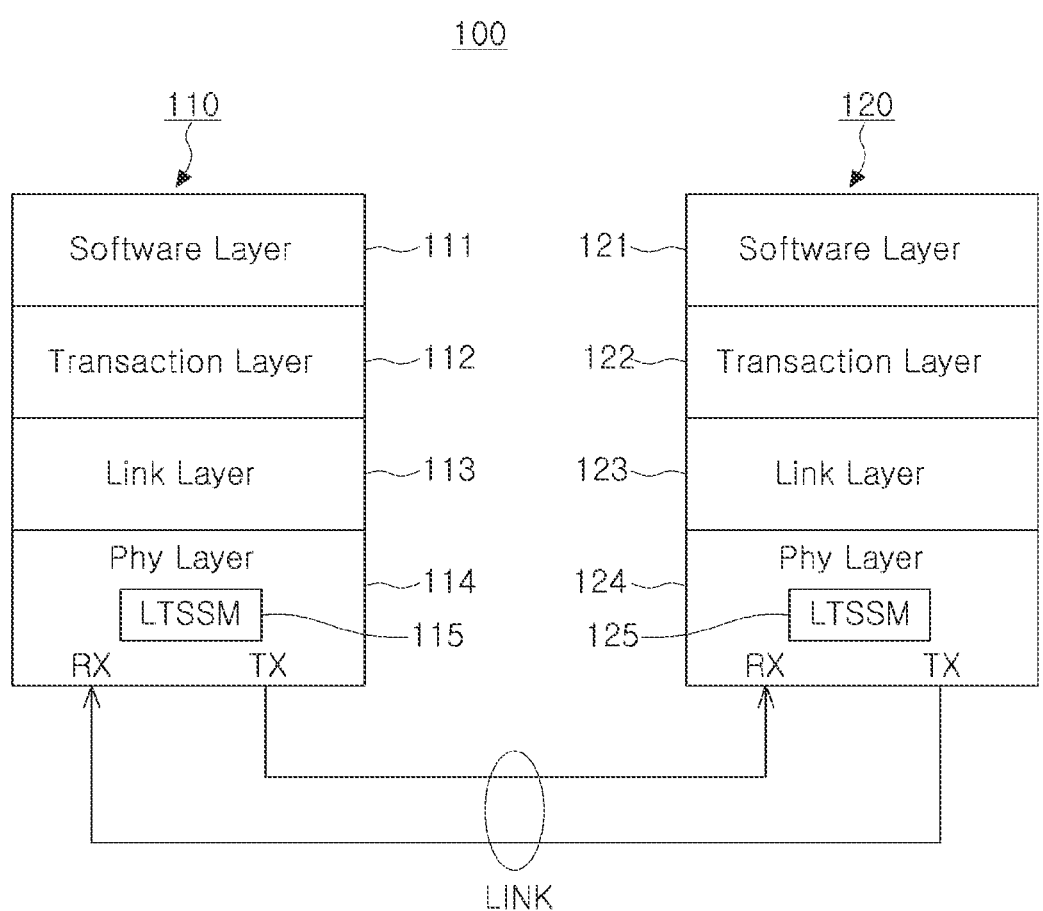
FIG. 3 is a block diagram illustrating an operation of a system including a semiconductor device according to an embodiment.

FIG. 3 illustrates an operation of a system including a semiconductor device according to an embodiment.

Referring to FIG. 3, a system 100, according to an embodiment, may include a first semiconductor device 110 and a second semiconductor device 120. The first semiconductor device 110 and the second semiconductor device 120 may exchange data over a link LINK according to a PCIe interface.

As illustrated in FIG. 3, a PCIe architecture may include a plurality of logically separated layers 111 to 114 and 121 to 124. As an example, the PCIe architecture may include software layers 111 and 121, transaction layers 112 and 122, link layers 113 and 123, and physical layers 114 and 124.

Among the layers included in the PCIe architecture, the physical layers 114 and 124 may be the relatively lowest layers and may be serially transmit packets, generated by the link layers 113 and 123, between the first and second semiconductor devices 110 and 120. Referring to FIG. 3, the physical layers 114 and 124 may provide the link LINK formed through a transmitter TX and a receiver RX of each of the first and second semiconductor devices 110 and 120. The packets may be transmitted between the first and second semiconductor devices 110 and 120 through the link LINK.

The link layers 113 and 123 may correspond to the upper layers of the physical layers 114 and 124, and may provide a function to ensure reliability of packet transmission through the link LINK and a function to manage the link LINK. For example, the link layers 113 and 123 may add sequence number information, link cyclic redundancy check (LCRC) information, and the like, to the packets generated by the transaction layers 112 and 122.

The transaction layers 112 and 122 may receive a read or write request from the software layers 111 and 121, and may generate and transmit a request packet to the link layers 113 and 123. In addition, the transaction layers 112 and 122 may receive a response packet from the link layers 113 and 123 and may match the received response packet with the request received from the software layers 111 and 121. The transaction layers 112 and 122 may transmit a packet including header information and end-to-end cyclic redundancy check (ECRC) information to the link layers 113 and 123.

The software layers 111 and 121 correspond to the relatively uppermost layers not explicitly defined by the PCIe technical specification, may include software for driving the semiconductor devices 110 and 120 including the PCIe interface, software for receiving a data read or write request from a user or a host application and providing a response to the data read or write request to the user or the host application, and the like.

More specific information regarding the physical layers 114 and 124, the link layers 113 and 123, the transaction layers 112 and 122, and the software layers 111 and 121 may be obtained by referral to the latest PCIe technical specification (see, e.g., https://pcisig.com/specifications), without limitation thereto.

Returning to FIG. 3, the physical layers 114 of the first semiconductor device 110 may include a link training and status state machine (LTSSM) 115. Similarly, the physical layer 124 of the second semiconductor device 120 may also include a LTSSM 125. As an example, the LTSSMs 115 and 125 may be respectively configured within the PCIe controllers provided by the semiconductor devices 110 and 120, but embodiments are not limited to such a form.

In the present embodiment, the first semiconductor device 110 will be described as an example. As may be described in greater detail with respect to FIG. 6, the LTSSM 115 may include a Detect state, a Polling state, a Configuration state, a Recovery state, an L0 state, an L0s state, an L1 state, an L2 state, a Hot Reset state, a Loopback state, and a Disable state. Thus, the LTSSM 115 may transition between eleven states, without limitation thereto, and may perform various processes for transmitting data according to the PCIe interface. Definitions, respectively associated with the eleven states included in the LTSSM 115, are provided in the PCIe specification, and the LTSSM 115 may be implemented to follow the definition of the LTSSM described in the PCIe specification.

In an embodiment, at least one of the LTSSM 115 of the first semiconductor device 110 and the LTSSM 125 of the second semiconductor device 120 may perform a link-up process of setting a link between the PCIe devices 100 and 200 used to exchange data with each other. As described above, data transmission paths between the first and second semiconductor devices 110 and 120 may be defined as a link LINK. A link LINK may include at least one pair of transmission and reception paths. Transmission and reception paths constituting a single pair may be defined as a "lane," and a number of lanes constituting a single link may be defined as a "link width."

At least one of the LTSSM 115 of the first semiconductor device 110 and the LTSSM 125 of the second semiconductor device 120 may perform a link number negotiation and a lane number negotiation to set a link LINK between the first and second semiconductor devices 110 and 120, and thus, may determine whether lanes are operating normally and may select lanes to be used for data transmission to set a link LINK and to determine a link width.

When the link-up is completed, the first and second semiconductor devices 110 and 120 may exchange data with each other. As described above, data packets exchanged between the physical layers 114 and 124 may further include header information, ECRC information, sequence number information, LCRC information, and the like, in addition to the original data to be transmitted.

Before the LTSSM 115 and 125 performs a link-up, PHY parameters may be adjusted in each of the physical layers 114 and 124. The PHY parameters may be parameters affecting at least one of a level, a slew rate, and a frequency of a signal output by the transmitter TX or received by the receiver RX.

PHY parameters may be defined in the PCIe specification. In general, PHY parameters may be preset before a device supporting a PCIe interface, such as the first and second semiconductor devices 110 and 120, is shipped. However, PHY parameters required to control the PCIe interface with optimal performance may vary depending on the type of device connected to the PCIe interface, an operating environment of a device, for example, temperature, or the like. When the PHY parameters are preset, it may be difficult to respond to the various conditions as described above.

In an embodiment, a device supporting a PCIe interface may have a calibration function which may change PHY parameters. As an example, the PCIe controller may perform a calibration function to change at least one of the PHY parameters, and re-perform a link-up process to set a link using the changed PHY parameters.

In an embodiment, the PCIe controller may refer to a reference sequence stored in a memory, or the like, in the process of re-performing the link-up process. The reference sequence may include states executed by the LTSSMs 115 and 125 in sequence until the link is normally set and the link-up is completed. Even when the link-up is completed, if the sequence of the states executed by the LTSSMs 115 and 125 until the link-up is completed is different from the reference sequence, the PCIe controller may adjust at least one of the PHY parameters and may re-perform the link-up using the LTSSM 115 and 125.

As an example, the PCIe controller may select and refer to one of a plurality of reference sequences. In a memory included in the semiconductor device together with the PCIe controller, a plurality of reference sequences classified depending on at least one of ambient environmental factors such as the type of an external device connected through a PCIe interface, an external temperature, and a magnitude of power may be stored. The PCIe controller may select an optimal reference sequence, among the plurality of reference sequences, in consideration of environmental factors at a time point of a calibration operation adjusting the PHY parameters, and may perform link-up based on the selected optical reference sequence.

As described above, a voltage level, a slew rate, a frequency, and the like, of a signal transmitted through a link LINK may vary depending on a change in the PHY parameters. Accordingly, in an embodiment, even when a device including a PCIe interface is shipped and an actual user is using the device, PHY parameters may be adjusted with settings optimized for various operating environments and PCIe parameters may be controlled with optimal performance.

Figure 4:
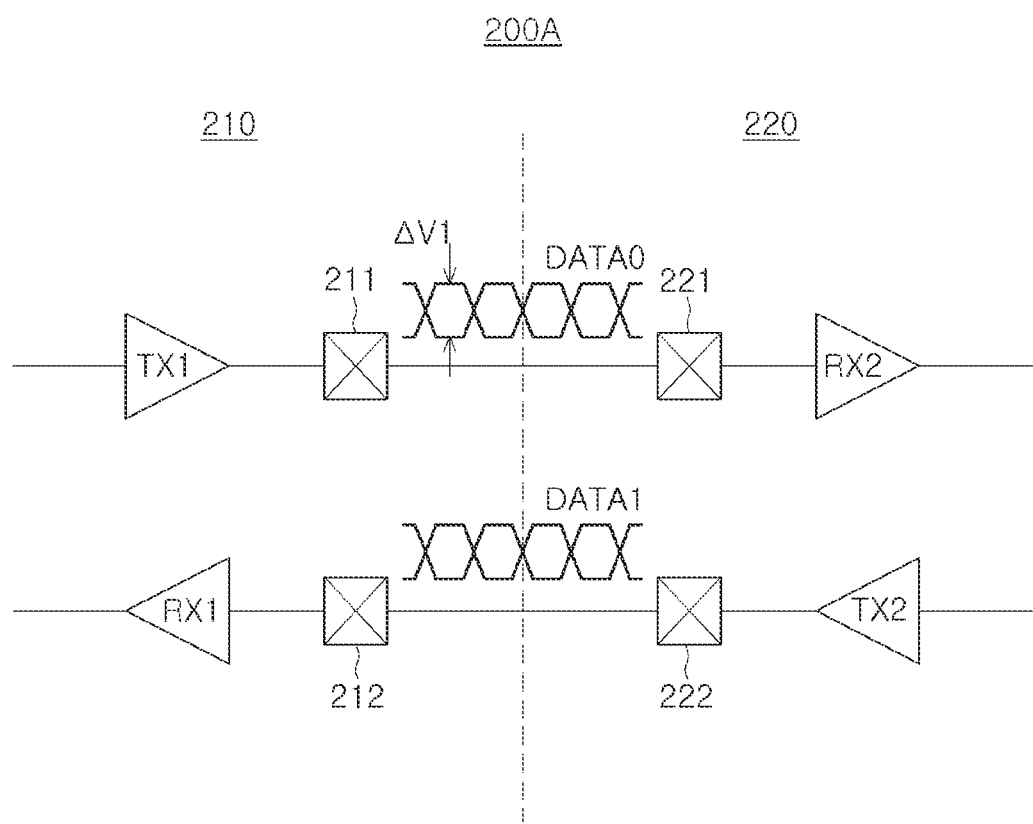
FIG. 4 is a hybrid diagram illustrating an operation of a system including a semiconductor device according to an embodiment.
Figure 5:
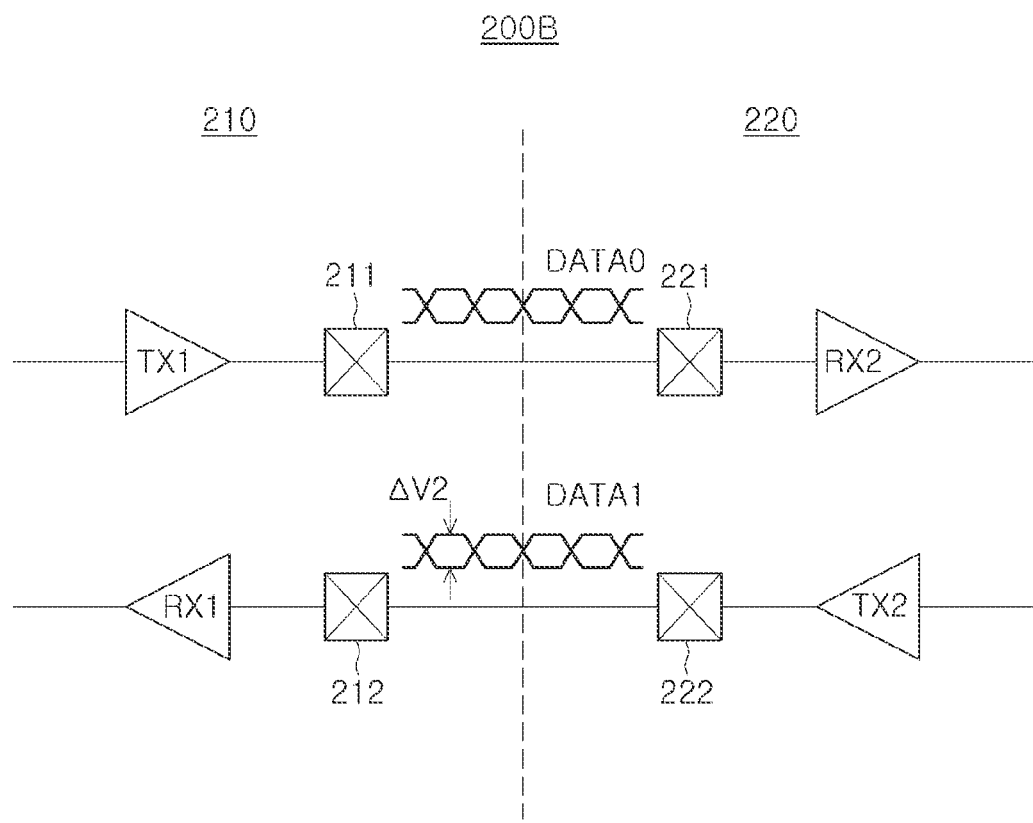
FIG. 5 is a hybrid diagram illustrating an operation of a system including a semiconductor device according to an embodiment.

FIGS. 4 and 5 illustrate an operation of a system including a semiconductor device according to an embodiment.

Referring to FIGS. 4 and 5, a system 200A or 200B, according to a respective embodiment, may include a first semiconductor device 210 and a second semiconductor device 220. The first semiconductor device 210 may include a first transmitter TX1 and a first receiver RX1, and the second semiconductor device 220 may include a second transmitter TX2 and a second receiver RX2.

In a first transmission path between a first transmission port 211 connected to the first transmitter TX1 and a second reception port 221 connected to the second receiver RX2, a first data signal DATA0 may be transmitted. In a second transmission path between a second transmission port 222 connected to the second transmitter TX2 and a first reception port 211 connected to the first receiver RX1, a second data signal DATA1 may be transmitted. The first transmission path and the second transmission path are included in a single lane. As illustrated in FIGS. 4 and 5, a path or lane for transmitting a pair of differential signals may be provided.

Each of the first and second data signals DATA0 and DATA1 may have a waveform as illustrated in FIGS. 4 and 5. For example, amplitudes ΔV1 of FIG. 4 and ΔV2 of FIG. 5 determined by maximum and minimum voltage levels of the first and second data signals DATA0 and DATA1, slew rates representing voltage increase and decrease rates of the first and second data signals DATA0 and DATA1, and the like, may be different in the embodiment illustrated in FIG. 4 and the embodiment illustrated in FIG. 5. For example, the amplitudes ΔV1 between the maximum and minimum voltage levels of the first or second data signals in FIG. 4 may be greater than those of ΔV2 in FIG. 5, without limitation thereto.

This may be because the PHY parameters, set when an LTSSM of at least one of the first and second semiconductor devices 210 and 220 terminates a link-up process, may be different from each other in the embodiment illustrated in FIG. 4 versus the embodiment illustrated in FIG. 5. At least one of the first and second semiconductor devices 210 and 220 may change at least one of the PHY parameters to re-perform the link-up process when a BISC request is received from a user, a predetermined time elapsed, or power is cut off and new power is suppled, without limitation thereto.

Accordingly, even when there is no change in the first and second semiconductor devices 210 and 220 constituting the system 200, at least one of the PHY parameters may have different values at different points in time. In addition, as at least one of the PHY parameters is set to different values, at least one of the data signals DATA0 and DATA1 transmitted through the same lane may have different waveforms as illustrated in FIGS. 4 and 5.

Figure 6:
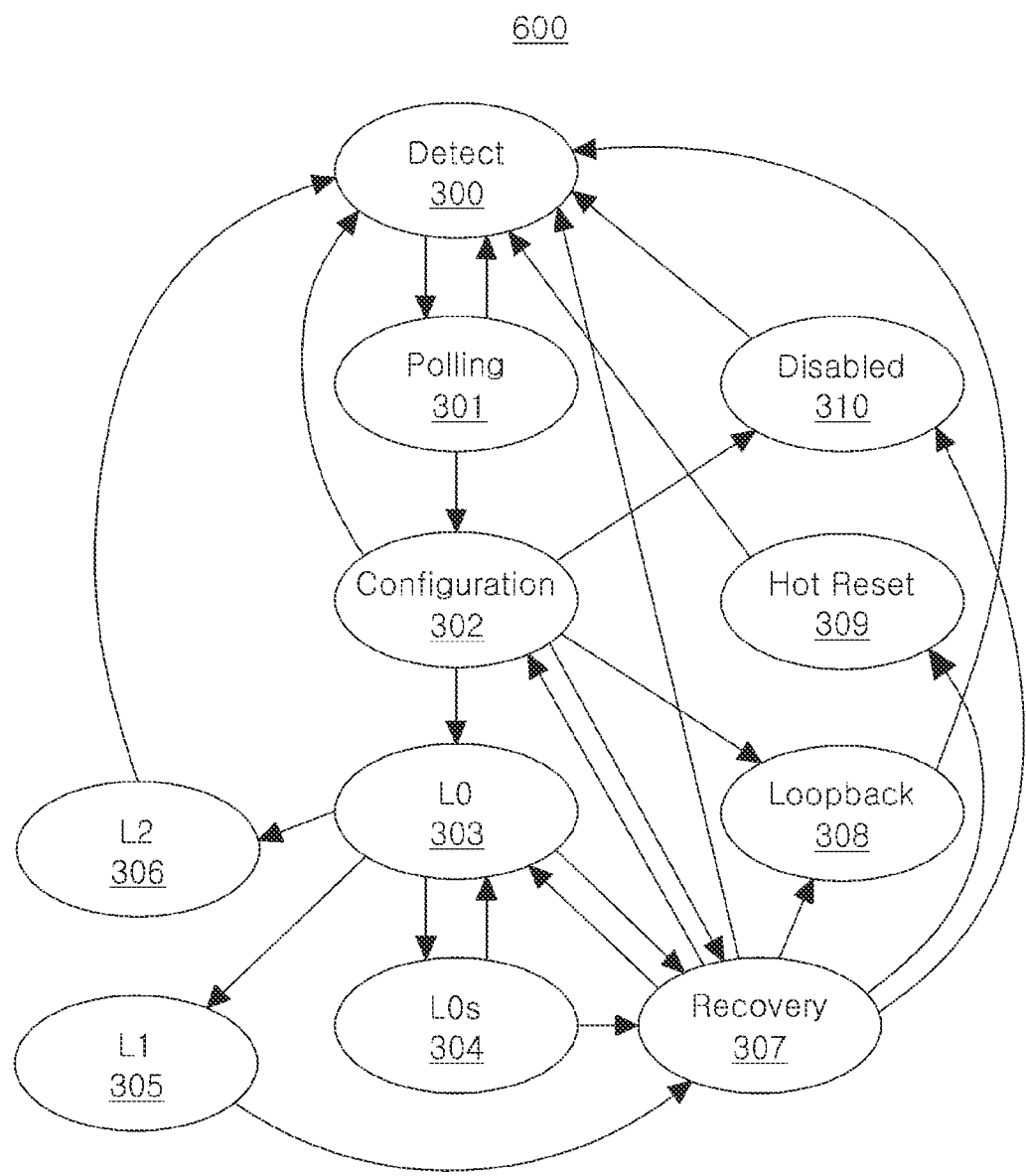
FIG. 6 is a state diagram illustrating a link training and status state machine (LTSSM) included in a semiconductor device according to an embodiment.

Turning now to FIG. 6, a link training and status state machine (LTSSM) is indicated generally by the reference numeral 60. FIG. 6 illustrates a LTSSM included in a semiconductor device according to an embodiment, without limitation thereto.

An LTSSM may provide a link-up process, a control process of configuring and initializing a link as described above. In addition to the configuration and initialization of the link in a PCIe interface, the LTSSM may perform a packet transmission support function, a link failure recovery function, and a PCIe interface restart function in a low-power state.

As an example, the LTSSM may transition to eleven states 300 to 310, and may perform the above-mentioned functions. The LTSSM may enter a Detect state 300 in which a circuit of a physical layer is initialized or presence of another external device connected to the PCIe interface is detected in response to a command received from a link layer. In the Detect state 300, the LTSSM may detect a receiver connected to the transmitter and may transition to a Polling state 301 in which bit lock, symbol lock, lane polarity, and the like, are set. As an example, when the LTSSM transitions from the Detect state 300 to the Polling state 301, a lane in which a receiver is not detected may enter an electrical idle state.

When the LTSSM transitions to a Configuration state 302, a data rate, a lane number, a link width, and the like, may be set. When an operation in the Configuration state 302 is completed, the LTSSM may enter an L0 state 303, a normal operation state in which data is exchanged through a set link. The LTSSM may transition to an L0s state 304, an electrical idle/standby state, an L1 state 305, a low-power standby/sleep state, or an L2 state 306, an off state, depending on an operation status of the PCIe interface.

In addition, when an error occurs while operating in the L0 state 303, the LTSSM may enter the Recovery state 307. In the recovery state 307, the LTSSM may perform a function such as a function of removing bit lock, symbol lock, inter-lane skew, and the like, or may change a link speed. The LTSSM may transition to the Recovery state 307 to return from the L1 state 305 to the L0 state 303.

A Loopback state 308 may be a state for a test, and the LTSSM may enter the Loopback state 308 depending on a value of a loopback bit in symbol sets and exchanged by devices connected to the PCIe interface and arranged in a predetermined sequence. In the Loopback state 308, the receiver may retransmit received packets in the same manner.

In the Hot Reset state 309, the LTSSM may perform a function of resetting the link. In the Disabled state 310, the transmitter may be switched to an electrical idle state by the LTSSM when the receiver is in a low-impedance state.

In the link-up process of configuring a link, the LTSSM may perform the above-described functions while moving to the eleven states 300 to 310 in a predetermined sequence. When the link-up is successfully performed, states actually executed by the LTSSM, among the states 300 to 310, and an execution sequence thereof until the link-up is successfully performed may be stored in an internal memory of the PCIe controller as a reference sequence.

In an embodiment, the PCIe controller may perform a calibration operation to internally adjust PHY parameters of the physical layer. When the calibration operation is performed, the PCIe controller may re-perform the link-up process for configuring the link based on the adjusted PHY parameters. When the link-up is successfully performed using the adjusted PHY parameters, the PCIe controller may compare the sequence of states, executed by the LTSSM, with the reference sequence until the link-up is completed.

When the sequence of states executed by the LTSSM does not match the reference sequence until the link-up is completed, the PCIe controller may re-change at least one of the PHY parameters and may re-perform the link-up process. To complete the link-up, the PCIe controller may change at least one of the PHY parameters and may repeatedly perform the link-up until the sequence of states executed by the LTSSM matches the reference sequence. Accordingly, a link may be configured with PHY parameters optimized for an operating environment at a current time point, or the like, and the performance of the PCIe interface may be improved.

Figure 7:
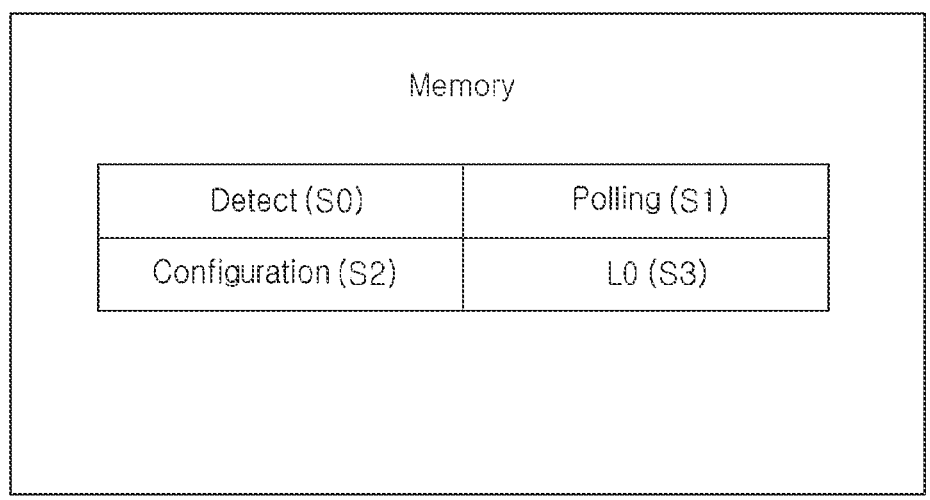
FIG. 7 is a block diagram illustrating an operation of a semiconductor device according to an embodiment.
Figure 8:
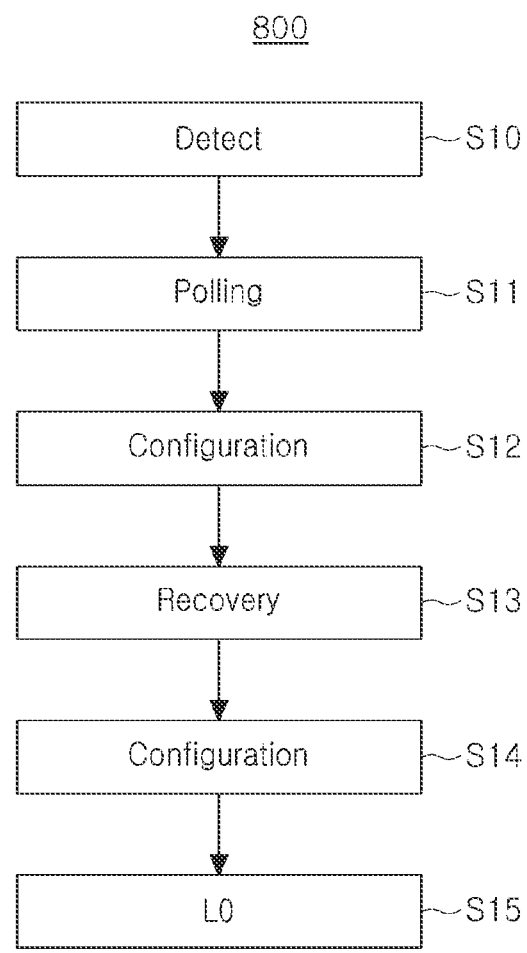
FIG. 8 is a flowchart diagram illustrating an operation of a semiconductor device according to an embodiment.
Figure 9:
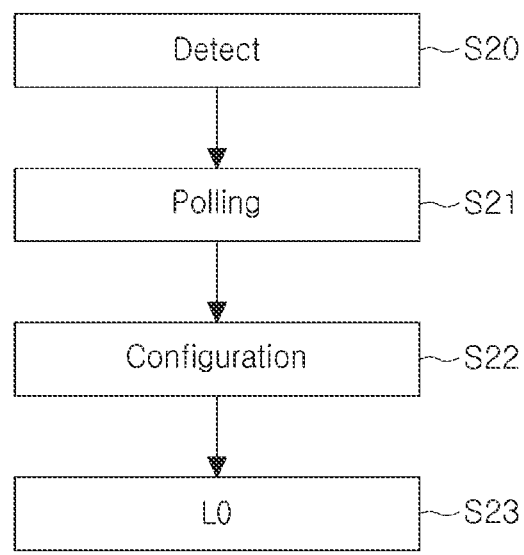
FIG. 9 is a flowchart diagram illustrating an operation of a semiconductor device according to an embodiment.

FIGS. 7 to 9 illustrate an operation of a semiconductor device according to an embodiment.

As shown in FIG. 7, a semiconductor device memory is indicated generally by the reference numeral 700. FIG. 7 illustrates a reference sequence stored in a memory in the semiconductor device according to an embodiment. As described above, the reference sequence may be a sequence in which an LTSSM succeeding in link-up executes states, and may be stored in a memory in the semiconductor device, for example, a PCIe controller together with the LTSSM.

Referring to FIG. 7, a reference sequence stored in the memory may include a Detect state S0, a Polling state S1, a Configuration state S2, and an L0 state S3 in order. In other words, in the embodiment illustrated in FIG. 7, the LTSSM may sequentially execute the Detect state S0, the Polling state S1, the Configuration state S2, and the L0 state S3 to succeed in link-up without entering a Recovery state, a Loopback state, a Hot Reset state, a Disabled state, or the like.

As described above, when a specific condition is satisfied, the PCIe controller of the semiconductor device may start a calibration operation to adjust PHY parameters of the PCIe interface. As an example, the PCIe controller may perform the calibration operation when receiving a request for a calibration operation from a user or a predetermined time elapsed after succeeding in link-up with an external device. Also, the PCIe controller may perform a calibration operation whenever new power is supplied.

Turning to FIG. 8, an operation method of a semiconductor device is indicated generally by the reference numeral 800. Referring to FIG. 8, one of the above conditions may be achieved and a calibration operation may be started, so that the PCIe controller may change at least one of the PHY parameters. The PCIe controller may also re-perform the link-up process based on the changed PHY parameters. In the embodiment illustrated in FIG. 8, during the link-up process, the LTSSM of the PCIe controller may sequentially perform a Detect state S10, a Polling state S11, a Configuration state S12, a Recovery state S13, a Configuration state S14, and an L0 state 15.

As an example, in the Configuration state S12 that the LTSSM enters first, the LTSSM may fail in one of a lane number assignment operation, an inter-lane skew removal operation, and the like. Thus, the LTSSM may enter the Recovery state S13 to reset bit lock, symbol lock, or the like, or to change a link speed. In the Configuration state S14 that the LTSSM enters second, the configuration of lanes and links may be completed and the LTSSM may transition to the L0 state 15.

However, even when the link-up is successfully performed through the operations illustrated in FIG. 8, the PCIe controller may re-perform the link-up process using the LTSSM. This may be because the sequence, in which the LTSSM executes the states in the embodiment illustrated in FIG. 8, is different from the reference sequence illustrated in FIG. 7. Accordingly, the PCIe controller may adjust at least one of the PHY parameters and may re-perform the link-up process. As a result of adjusting the PHY parameters and re-performing the link-up process, when the link-up is successfully performed by sequentially executing a Detect state S20, a Polling state S21, a Configuration state S22, and an L0 state S23, the PCIe controller may complete the calibration operation.

Turning now to FIG. 9, an operation method of a semiconductor device is indicated generally by the reference numeral 900. The steps of the operation method 900 are similar to several above-described steps of the operation method 800, so duplicate description may be omitted.

FIGS. 10 to 13 illustrate an operation of a semiconductor device according to an embodiment.

Figure 10:
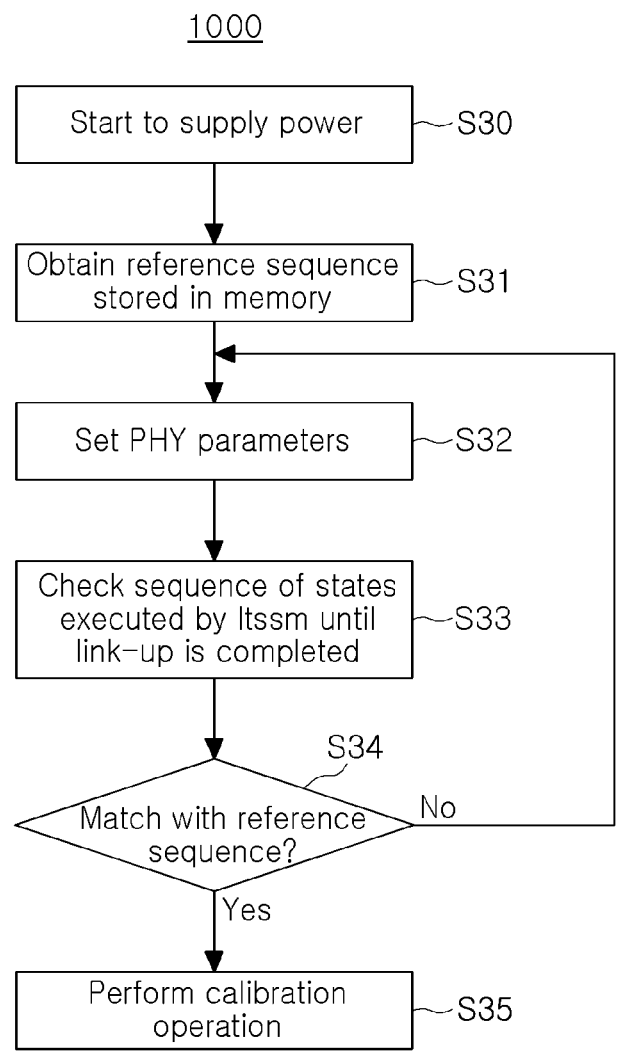
FIG. 10 is a flowchart diagram illustrating an operation of a semiconductor device according to an embodiment.

As shown in FIG. 10, an operation method of a semiconductor device is indicated generally by the reference numeral 1000. Referring to FIG. 10, the operation of the semiconductor device according to an embodiment may be start with operation S30 in which power is supplied. The power, supplied in operation S30, may be power required for an operation of the semiconductor device. A PCIe interface, included in the semiconductor device to be connected to another external semiconductor device, may start to operate using the power supplied in operation S30.

In the embodiment illustrated in FIG. 10, the PCIe controller controlling a PCIe interface may adjust PHY parameters whenever power is supplied. When power is supplied, the PCIe controller may obtain a reference sequence stored in the memory in operation S31 and may set each of the PHY parameters in operation S32.

In operation S33, the PCIe controller starts a link-up process using an LTSSM and may check a sequence of states executed by the LTSSM until the link-up is completed. In operation S34, the PCIe controller may compare the sequence checked in operation S33 with the reference sequence. When the sequence checked in operation S33 does not match the reference sequence, the PCIe controller may reset the PHY parameters in operation S32 and may re-compare the sequence of the states executed by the LTSSM with the reference sequence until the link-up is completed in operations S33 and S34. When the sequence checked in operation S33 matches the reference sequence, the PCIe controller may complete the calibration operation in operation S35 and may complete link setting of the PCIe interface.

Figure 11:
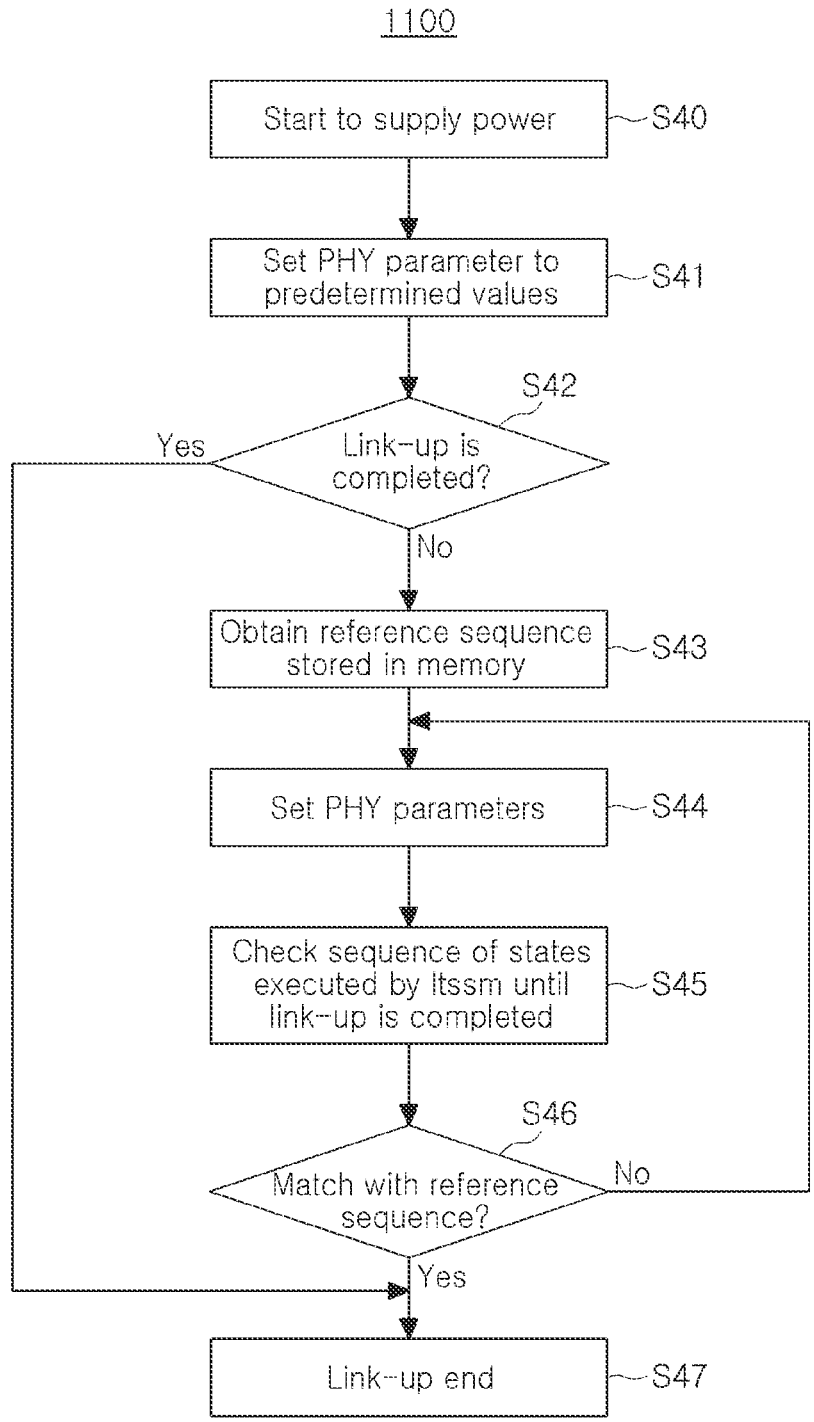
FIG. 11 is a flowchart diagram illustrating an operation of a semiconductor device according to an embodiment.

Turning to FIG. 11, an operation method of a semiconductor device is indicated generally by the reference numeral 1100. Referring to FIG. 11, the operation of the semiconductor device according to an embodiment may start with operation S40 in which power is supplied. When power is supplied, a PCIe controller controlling a PCIe interface may set PHY parameters to a predetermined value in operation S41 and may determine whether the link-up has been completed, in operation SS42. The PCIe controller may determine whether link-up has been normally completed with PHY parameters having a predetermined value.

When the link-up is determined to be completed in operation S42, the PCIe controller may complete the link-up in operation S47. Meanwhile, when the link-up is not completed in operation S42, the PCIe controller may determine that the link-up is not completed with currently set values for the PHY parameters. Accordingly, a calibration operation may be performed to adjust the PHY parameters.

The PCIe controller may obtain a reference sequence stored in the memory in operation S43, and may set the PHY parameters to values different from the currently set values in operation S44. After setting the PHY parameters to the different values in operation S44, the PCIe controller may perform a link-up process using an LTSSM. While the LTSSM performs the link-up process, the PCIe controller may check a sequence of states executed in the LTSSM in operation S45 and may compare the checked sequence with the reference sequence to determine whether the sequences have matched each other in operation S46.

Based on the determination in operation S46, when the sequence of the states executed by the LTSSM during the link-up process matches the reference sequence, the PCIe controller may complete the link-up in operation S47 and may start to transmit a signal through the PCIe interface. Meanwhile, as a result of the determination in operation S46, when the sequence of the states executed by the LTSSM does not match the reference sequence, the PCIe controller may re-adjust the PHY parameters to different values and may re-perform the link-up process using the LTSSM. The PCIe controller may adjust a value of at least one of the PHY parameters to repeatedly perform the link-up process until the sequence of the states executed by the LTSSM matches the reference sequence until the link-up is completed.

Figure 12:
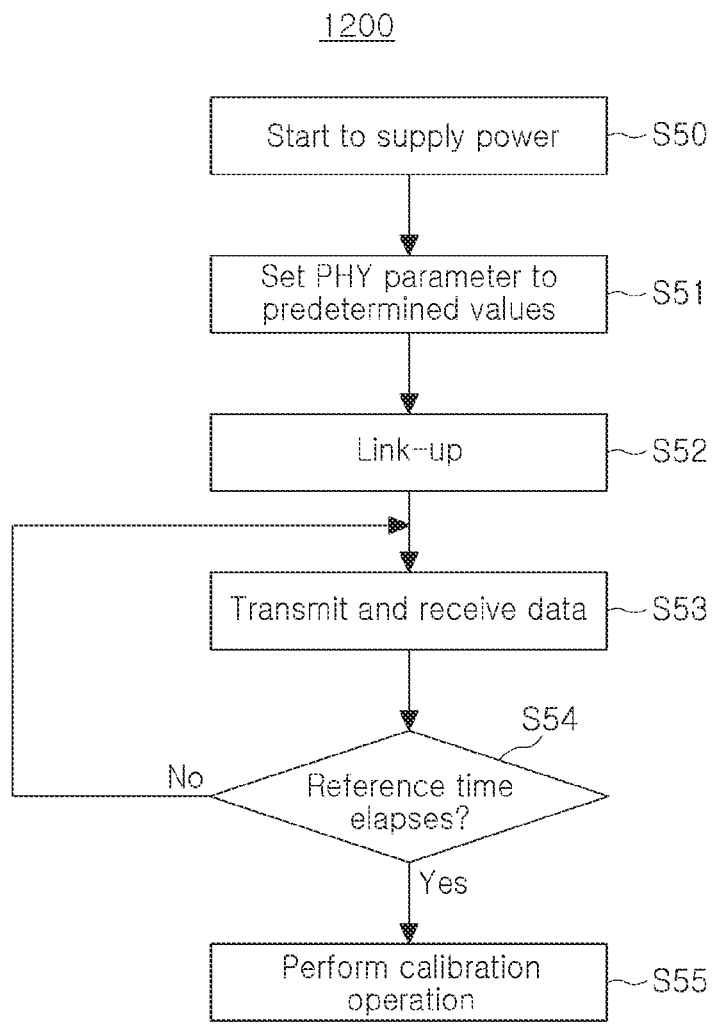
FIG. 12 is a flowchart diagram illustrating an operation of a semiconductor device according to an embodiment.

Turning now to FIG. 12, an operation method of a semiconductor device is indicated generally by the reference numeral 1200. Referring to FIG. 12, the operation of the semiconductor device according to an embodiment may start with operation S50 in which power is supplied. When power is supplied, a PCIe controller controlling a PCIe interface may set PHY parameters to a predetermined value in operation S51 and may complete link-up according to the set PHY parameters in operation S52. When the link-up is completed, semiconductor devices connected to each other by the PCIe interface may exchange data with each other in operation S53.

In operation S54, the PCIe controller may count time elapsed from a time point at which the link is configured while the link is configured in the PCIe interface and the semiconductor devices exchange data with each other, and may determine whether the counted time has exceeded a preset time or a reference time set manually by the user. Before the counted time exceeds the reference time, the PCIe controller may control the PCIe interface and may exchange data according to the link settings configured in operations S51 and S52.

Meanwhile, when the time from the time point at which the link is configured exceeds the reference time, the PCIe controller may perform a calibration operation in operation S55. However, when the calibration operation starts, a link-up process should be performed to change at least one of the PHY parameters and to reconfigure the link of the PCIe interface. Therefore, during data transmission through the PCIe interface, the calibration operation may not be immediately performed even when exceeding the reference time. As an example, the PCIe controller may start a calibration operation after waiting until data transmission is completed even after exceeding the reference time. Also, the PCIe controller may start a calibration operation when exceeding the reference time and a state of the LTSSM transitions to the L0s state or the L1 state.

Figure 13:
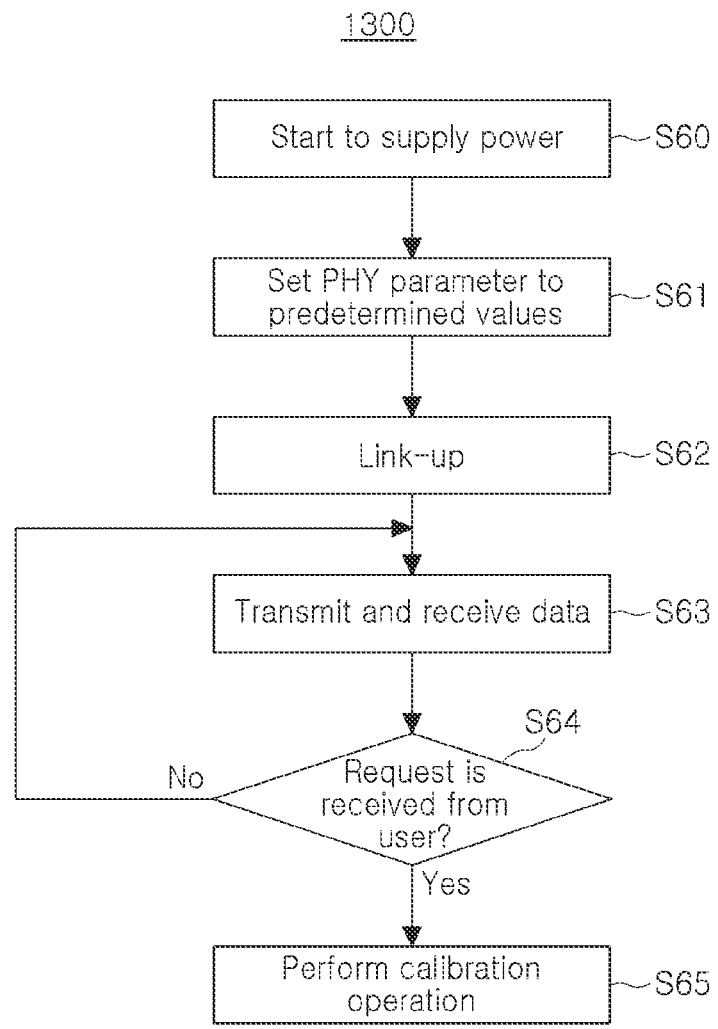
FIG. 13 is a flowchart diagram illustrating an operation of a semiconductor device according to an embodiment.

As shown in FIG. 13, an operation method of a semiconductor device is indicated generally by the reference numeral 1300. Referring to FIG. 13, the operation of the semiconductor device according to an embodiment may start with operation S60 in which power is supplied. When power is supplied, a PCIe controller controlling a PCIe interface may set PHY parameters to a predetermined value in operation S61 and may complete the link-up according to the set PHY parameters in operation S62. When the link-up is completed, semiconductor devices connected to each other by the PCIe interface may exchange data with each other in operation S63.

In operation S54, the PCIe controller may monitor whether a request is received from a user while a link is configured in the PCIe interface and the semiconductor devices exchange data. In the embodiment illustrated in FIG. 13, the user may directly request a calibration operation using a tool executable in a system while a semiconductor device is mounted in the system and performs an operation such as data exchange with another semiconductor device through a PCIe interface. In other words, the user may manually perform a calibration operation even when the semiconductor device continuously operates without cutting off power or even before a link of the PCIe interface is configured and a predetermined reference time elapses.

In operation S65, the PCIe controller may perform the calibration operation when receiving a request for the calibration operation from the user. The PCIe controller may change at least one of the PHY parameters and re-perform a link-up process to configure a link of the PCIe interface. Also, the PCIe controller may write a sequence of states executed by an LTSSM until the link-up is completed, and may compare the written sequence with a stored reference sequence. When the written sequence and the stored reference sequence match each other, the PCIe controller complete link configuration. Meanwhile, the written sequence and the stored reference sequence do not match each other, the PCIe controller may readjust at least one of the PHY parameters and may re-perform the link-up process.

In the embodiment illustrated in FIG. 13, at a time point at which a request for a calibration operation is received from a user, the semiconductor device may be exchanging data with another semiconductor device through the PCIe interface. As an example, the semiconductor device may perform a calibration operation according to the request from the user after waiting until data transmission is completed. As described above with reference to FIG. 12, the calibration operation may be performed after the state of the LTSSM transitions to the L0s state, the L1 state, and the like. Alternatively, a request directly input by a user may be prioritized, so that data transmission may be forcibly stopped and the calibration operation may be performed first.

Figure 14:
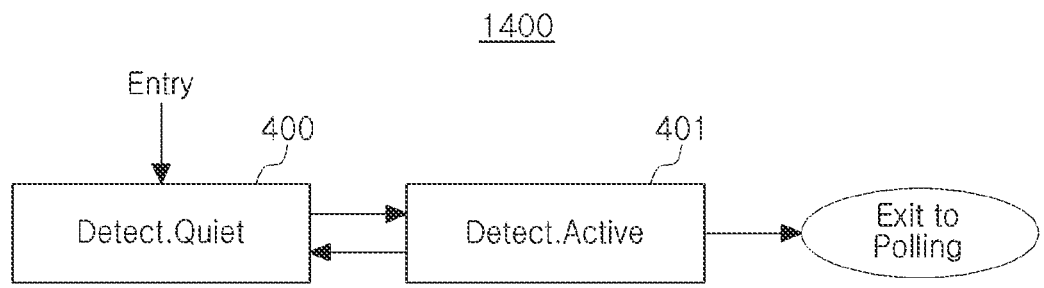
FIG. 14 is a hybrid diagram illustrating states included in an LTSSM, in a semiconductor device according to an embodiment.
Figure 16:
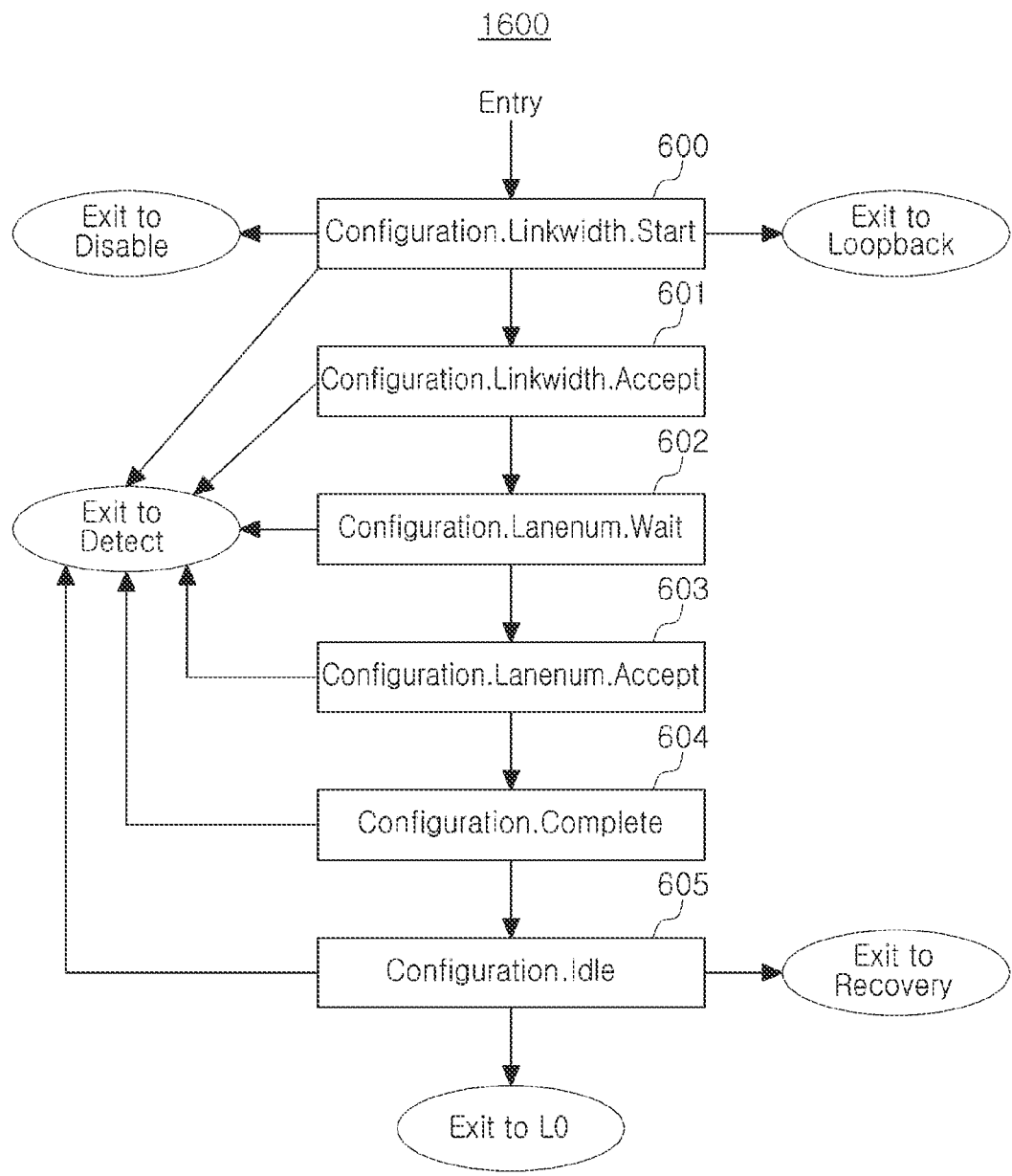
FIG. 16 is a hybrid diagram illustrating states included in an LTSSM, in a semiconductor device according to an embodiment.

FIGS. 14 and 16 illustrate states included in an LTSSM, in a semiconductor device according to an embodiment.

Turning to FIG. 14, a configuration state of a semiconductor device is indicated generally by the reference numeral 1400. FIG. 14 illustrates sub-states included in a Detect state, among the states included in the LTSSM. Referring to FIG. 14, the Detect state may include a first detect sub-state 400 and a second detect sub-state 401.

As described above, the Detect state may be a state in which a process of configuring a link of a PCIe interface is started. When the LTSSM transitions from an initial state (Entry) to the first detect sub-state 400, a physical layer may operate in an electrical idle state.

When a predetermined time elapses in the first detect sub-state 400 or the lanes are outside of the electrical idle state, the LTSSM may enter the second detect sub-state 401 from the first detect sub-state 400 and may start an operation of detecting a receiver. As an example, whether the receiver is connected may be determined according to the size of the RC time constant. When the receiver is normally detected, the LTSSM may enter a Polling state from the second detect sub-state 401.

Figure 15:
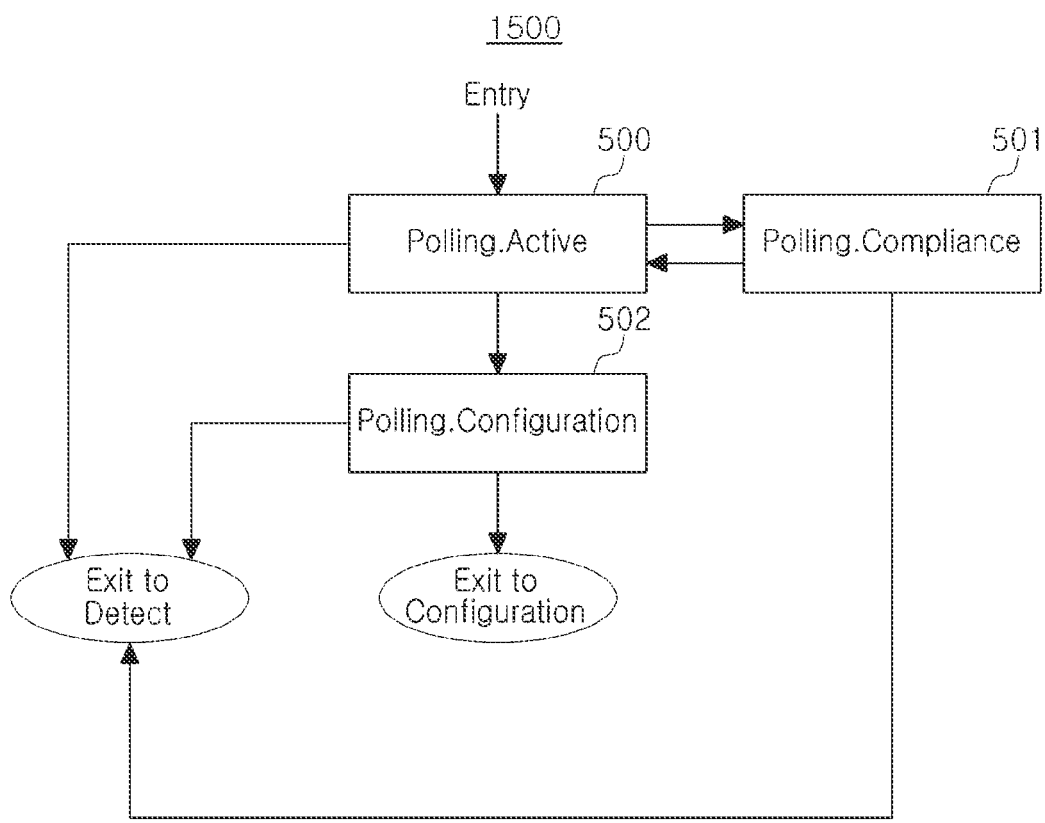
FIG. 15 is a hybrid diagram illustrating states included in an LTSSM, in a semiconductor device according to an embodiment.

Turning now to FIG. 15, a configuration state of a semiconductor device is indicated generally by the reference numeral 1500. FIG. 15 illustrates sub-states included in a Polling state, among the states included in the LTSSM. Referring to FIG. 15, the Polling state may include a first polling sub-state (Polling.Active, 500), a second polling sub-state (Polling.Compliance, 501), and a third polling sub-state (Polling.Configuration, 502). As described above, operations such as bit lock and symbol lock may be performed in the Polling state.

When transitioning from the Detect state to the Polling state, the LTSSM may enter the first polling sub-state 500. In the first polling sub-state 500, a transmitter may transmit predetermined sequences through a lane and a reception side may be set based on the sequences. In the second polling sub-state 501, the transmitter may stop transmitting sequences and may check polarity of the lane. As an example, when termination of the electrical idle state is not detected in the lane to which the receiver is determined to be connected, the LTSSM may transition from the first polling sub-state 500 to the second polling sub-state 501. The LTSSM may be maintained in the second polling sub-state 501 until the electrical idle state in the corresponding lane is terminated.

In the third polling sub-state 502, a test may be conducted as to whether a requirement in the specification of the PCIe interface is satisfied, using different bit patterns. When the test in the third polling sub-state 502 is completed, the LTSSM may enter a Configuration state. However, as illustrated in FIG. 15, when a specific condition is satisfied in each of the first to third polling sub-states 500 to 502, the LTSSM may transition back to the detection state.

As shown in FIG. 16, a configuration state of a semiconductor device is indicated generally by the reference numeral 1600. Referring to FIG. 16, a Configuration state included in LTSSM may include six configuration sub-states 600 to 605. In at least some of the six configuration sub-states 600 to 605, the LTSSM may generate a set of symbols arranged in a predetermined sequence to be different from each other. A link width may be set in the first configuration sub-state (Configuration.Linkwidth.Start) 600 and the second configuration sub-state (Configuration.Linkwidth.Accept) 601. However, when the link width starts to be set in the first configuration sub-state 600, the LTSSM may enter a Detect state, an Inactive state, or a Loopback state.

When the link width is set in the first configuration sub-state 600 and the second configuration sub-state 601, lane numbers may be set in the third configuration sub-state (Configuration.Lanenum.Wait) 602 and the fourth configuration sub-state (In Configuration.Lanenum.Accept) 603. When the setting of the link width and lane numbers is completed, the LTSSM may wait in the fifth configuration sub-state (Configuration.Complete) 604. As an example, lanes which do not constitute a link may be turned off.

In the sixth configuration sub-state 605, the transmitter may transmit idle data symbols through lanes constituting the link, and the receiver may receive the transmitted symbols. When no idle data symbol is detected for a predetermined period of time, the LTSSM may enter a recovery state, rather than an L0 state which is a normal operating state, from the sixth configuration sub-state 605.

As described with reference to FIGS. 14 to 16, each of the Detect state, the Polling state, the Configuration state, and the like, included in the LTSSM may include a plurality of sub-states. In addition, each of the Recovery state, the L0s state, the L1 state, the L2 state, the Loopback state, and the like, may also include two or more sub-states.

In an embodiment, a sequence in which sub-states are executed in each of the states may be included in the reference sequence in which a sequence of states executed by the LTSSM to complete the link-up is written. Accordingly, after the link-up is completed, the sequence of the sub-states executed by the LTSSM may be compared with the sequence of the sub-states, included in the reference sequence, to accurately determine whether PHY parameters are set such that the PCIe interface operates with optimal performance. Hereinafter, this will be described in greater detail with reference to FIGS. 17 and 18.

Figure 17:
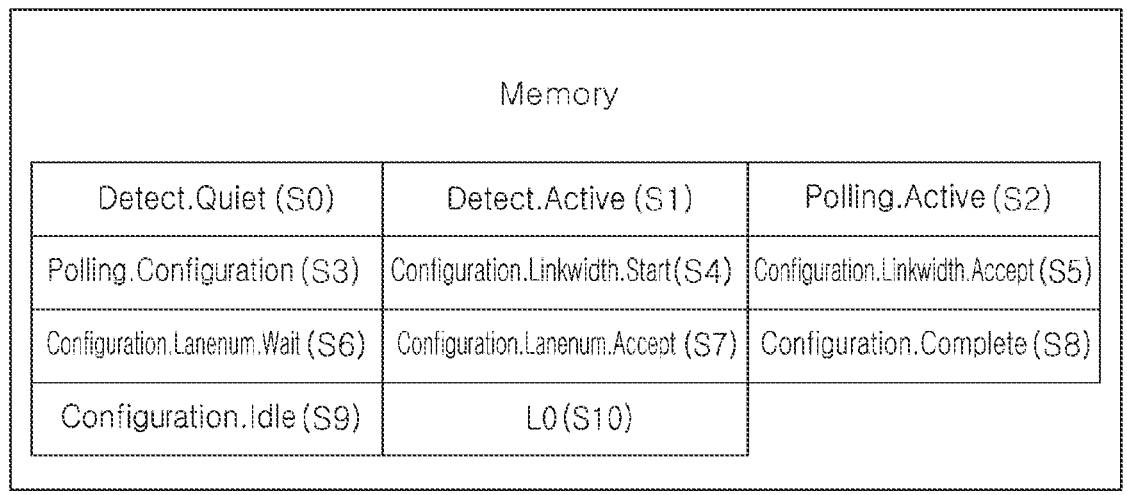
FIG. 17 is a block diagram illustrating an operation of a semiconductor device according to an embodiment.
Figure 18:
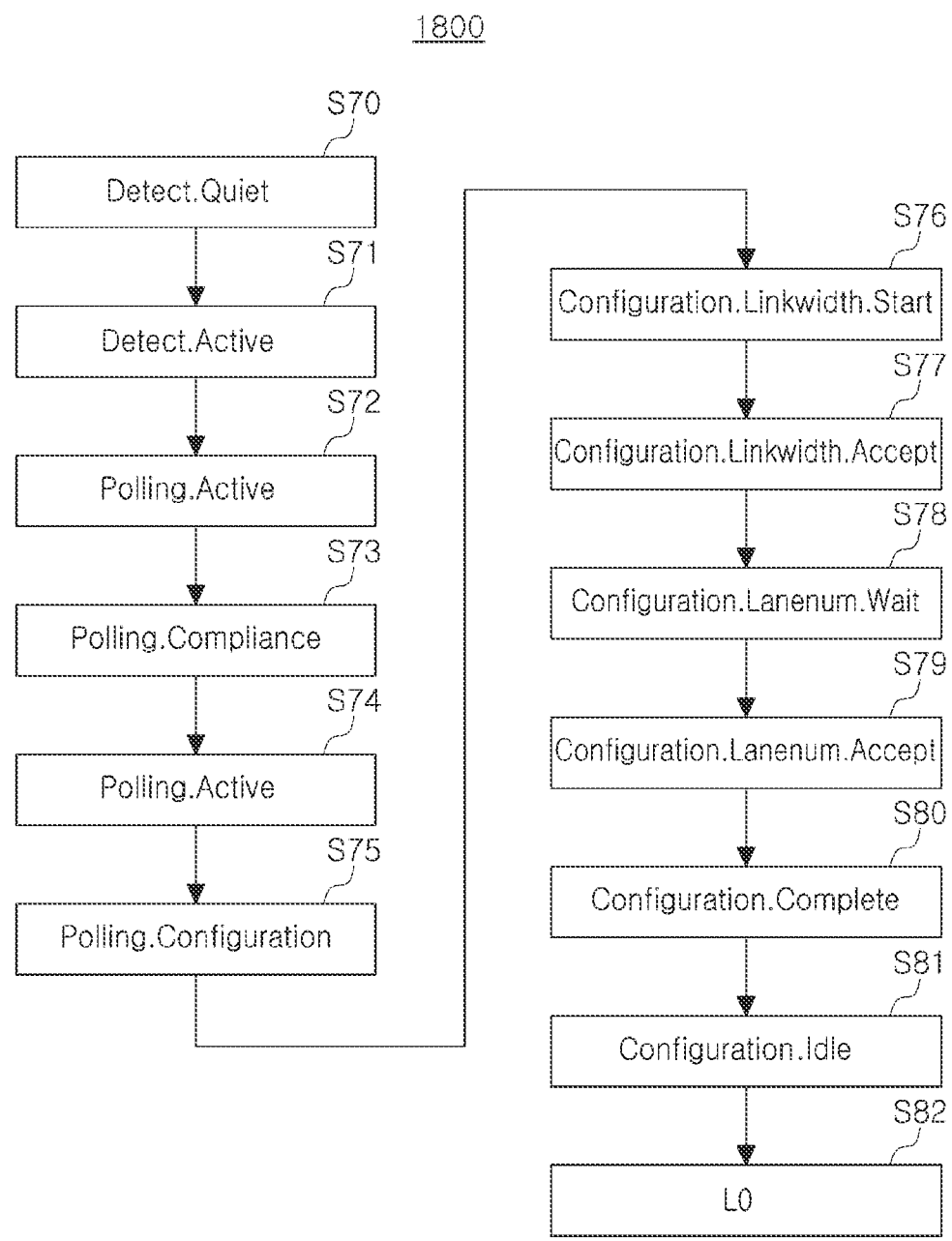
FIG. 18 is a flowchart diagram illustrating an operation of a semiconductor device according to an embodiment.

FIGS. 17 and 18 illustrate an operation of a semiconductor device according to an embodiment.

Turning to FIG. 17, a semiconductor device memory is indicated generally by the reference numeral 1700. FIG. 17 shows a reference sequence stored in a memory in a semiconductor device according to an embodiment. The reference sequence may be a sequence in which an LTSSM succeeding in link-up executes sub-states, and may be stored together with the LTSSM in a memory, or the like, in a PCIe controller.

In the embodiment illustrated in FIG. 17, a reference sequence stored in the memory may include first to eleventh sub-states S0 to S11. The first and second sub-states S0 and S1 may be sub-states of the Detect state, and the third and fourth sub-states S2 and S3 may be sub-states included in the Polling state. The fifth to tenth sub-states S4 to S9 may be sub-states included in the Configuration state, and the eleventh sub-state S10 may be an L0 state, a normal operation state.

Under a specific condition, the PCIe controller of the semiconductor device may start a calibration operation of adjusting PHY parameters of the PCIe interface. The PCIe controller may perform the calibration operation when a predetermined reference time has elapsed after receiving a request for the calibration operation from a user or succeeding in link-up with an external device. Also, the PCIe controller may perform a calibration operation whenever new power is supplied.

When the calibration operation starts, the PCIe controller may change at least one of the PHY parameters and may re-perform a link-up process based on the changed PHY parameters.

Turning now to FIG. 18, a configuration state of a semiconductor device is indicated generally by the reference numeral 1800. In the embodiment illustrated in FIG. 18, the LTSSM of the PCIe controller may sequentially transition among the first to thirteenth sub-states S70 to S82 to configure a link.

As an example, the LTSSM may normally detect a receiver connected to lanes which are not yet configured in a first sub-state S70 and a second sub-state S71 and may enter a Poling state. The first sub-state S70 may be a first detect sub-state (Detect.Quiet), and the second sub-state S71 may be a second detect sub-state (Detect.Active).

When entering the Polling state, the LTSSM may define ordered sets to be transmitted between semiconductor devices connected to the PCIe interface for link training. As an example, the transmitter may transmit training sequences in the third sub-state S72, the first polling sub-state (Polling.Active). However, in the embodiment illustrated in FIG. 18, the LTSSM need not directly enter the third polling sub-state (Polling.Configuration) from the first polling sub-state (Polling.Active) and may transition to the third polling sub-state (Polling.Configuration) through the second polling sub-state (Polling.Compliance). Referring to FIG. 18, the above state transition may occur in the third to sixth sub-states S72 to S75.

The LTSSM may enter the Configuration state from the third polling sub-state (Polling.Configuration). Referring to FIG. 18, the LTSSM may sequentially transition the seventh to twelfth sub-states S76 to S81, corresponding to the six sub-states, included in the Configuration state, to complete, link configuration and may enter thirteenth sub-state S82.

A sequence of the sub-states S70 to S82 according to the embodiment illustrated in FIG. 18 may not match the reference sequence described with reference to FIG. 17. Accordingly, the PCIe controller may change at least one of the PHY parameters into a different value and may re-perform the link-up process using the LTSSM.

The PCIe controller may change the PHY parameters into various combinations until the LTSSM executes the sub-states in a sequence matching the reference sequence. Accordingly, the PCIe interface may be automatically reconfigured such that the PCIe controller operates with optimal performance for the current environment. In addition, the PCIe controller may establish communications through the PCIe interface, and may change the PHY parameters during operation, even after the semiconductor device including the PCIe controller is shipped, and may reconfigure a link of the PCIe interface according to the changed PHY parameters, so that versatility of the semiconductor device may be increased.

According to the above-described and like embodiments, a reference sequence, defining a sequence of states executed by an LTSSM to set a link between semiconductor devices, may be stored in a memory in a PCIe controller. In a calibration operation of adjusting PHY parameters, the PCIe controller may compare the sequence of states, executed by the LTSSM to set the link, with the reference sequence, and may change at least one of the PHY parameters until a result of the comparison indicates that the sequence and the reference sequence match each other. Accordingly, even after a semiconductor device including the PCIe interface is shipped or mounted in a system, data communications under variable conditions may be effectively implemented by adjusting PHY parameters.

While embodiments have been shown and described above, it will be apparent to those of ordinary skill in the pertinent art that modifications and variations may be made without departing from the scope of the present inventive concept as defined by the appended claims.

What is claimed is:
1. A semiconductor device comprising:
a plurality of ports configured for exchanging data with each other in an interface; and
an interface controller including a link training and status state machine (LTSSM) and a memory,
wherein the LTSSM is configured to execute link-up by executing a sequence of states that succeeds in setting a plurality of lanes to the plurality of ports,
wherein the memory is configured to store the sequence of states that succeeds as a reference sequence,
wherein the interface controller changes at least one of the PHY parameters when a calibration operation of adjusting the PHY parameters starts until a sequence of the states, executed by the LTSSM to complete the link-up, matches the reference sequence.

2. The semiconductor device of claim 1, wherein: the interface controller is configured to perform the calibration operation whenever power is turned on again after the power is turned off.

3. The semiconductor device of claim 1, wherein:
the interface is a Peripheral Component Interconnect Express (PCIe) interface,
the interface controller is a PCIe controller configured to re-perform the calibration operation when a predetermined reference time elapses after the LTSSM succeeds in link-up.

4. The semiconductor device of claim 3, wherein:
the PCIe controller performs the calibration operation after waiting until transmission of data is completed when the data is transmitted in at least one of the plurality of ports at a time point at which the reference time elapses.

5. The semiconductor device of claim 3, wherein:
the PCIe controller performs the calibration operation when a state of the LTSSM transitions to an L0s state or an L1 state after the reference time elapses.

6. The semiconductor device of claim 1, wherein:
the interface controller performs the calibration operation when receiving a request from a user.

7. The semiconductor device of claim 1, wherein:
each of the plurality of ports is connected to a transmitter and a receiver; and
a setting of at least one of the transmitter and the receiver, connected to at least of the plurality of ports, is changed when the interface controller adjusts the PHY parameters.

8. The semiconductor device of claim 7, wherein:
at least one of a level, a slew rate, and a frequency of a signal, output by the transmitter or received by the receiver, is changed.

9. The semiconductor device of claim 1, wherein:
at least one of the states, executed by the LTSSM, includes two or more sub-states; and
the reference sequence includes a sequence in which the LTSSM succeeding in the link-up executes the sub-states.

10. The semiconductor device of claim 1, wherein:
the reference sequence includes a Detect state, a Polling state, a Configuration state, and an L0 state, a normal operation state, in order.

11. A semiconductor device comprising:
a plurality of ports exchanging data with each other under an interface environment; and
an interface controller including a link training and status state machine (LTSSM) and a memory,
wherein the LTSSM is configured to execute link-up by executing a sequence of states that succeeds in setting a plurality of lanes to the plurality of ports,
wherein the memory is configured to store the sequence of states that succeeds as a reference sequence,
wherein the interface controller changes at least one PHY parameter, among PHY parameters determining characteristics of signals input to the plurality of ports and output from the plurality of ports, at each of a first time point and a second time point subsequent to an operation start time point at which the plurality of ports are connected to an external device and receive power.

12. The semiconductor device of claim 11, wherein:
the interface controller receives a built-in self-calibration (BISC) request from a user at a time point between the first time point and the second time point.

13. The semiconductor device of claim 11, wherein:
the interface controller changes at least one of the PHY parameters when a predetermined reference time has elapsed from the operation start time point; and
the reference time is shorter than a time from the operation start time point to the first time point.

14. The semiconductor device of claim 11, wherein:
the interface controller changes at least one of the PHY parameters and tries link-up with the external device using the LTSSM; and
the interface controller changes at least one of the PHY parameters until a sequent of states, executed by the LTSSM to complete the link-up with the external device, matches the reference sequence.

15. The semiconductor device of claim 11, wherein:
the memory stores a plurality of reference sequences classified depending on at least one of a type of the external device, an external temperature, and a magnitude of the power.

16. The semiconductor device of claim 15, wherein:
the interface controller is a Peripheral Component Interconnect Express (PCIe) controller,
the PCIe controller selects at least one of the plurality of reference sequences based on at least one of the external temperature and the magnitude of the power at each of the first time point and the second time point, and
the PCIe controller changes at least one of the PHY parameters until a sequence of states, executed by the LTSSM to complete the link-up with external device, matches the selected reference sequence.

17. A system comprising:
a first semiconductor device including a first interface and a first interface controller configured to control the first interface;
a second semiconductor device including a second interface and a second interface controller configured to control the second interface; and
a third semiconductor device including a third interface, connected to the first interface, and a fourth interface connected to the second interface,
wherein the first interface controller changes at least one PHY parameter, among PHY parameters of the first interface, at a first time point and reconfigures a link between the first interface and the third interface,
wherein the second interface controller changes at least one PHY parameter, among PHY parameters of the second interface, at a second time point, different from the first time point, and reconfigures a link between the second interface and the fourth interface,
wherein at least one of the first semiconductor device or the second semiconductor device includes a link training and status state machine (LTSSM) and a memory,
wherein the LTSSM is configured to execute link-up by executing a sequence of states that succeeds in setting a plurality of lanes to a plurality of ports,
wherein the memory is configured to store the sequence of states that succeeds as a reference sequence.

18. The system of claim 17, wherein:
at least one of the first interface controller or the second interface controller is a Peripheral Component Interconnect Express (PCIe) controller,
the third semiconductor device is a host device, and the first semiconductor device and the second semiconductor device perform different functions.

19. The system of claim 17,
wherein each of the first semiconductor device and the second semiconductor device includes an LTSSM and a memory,
wherein each LTSSM is configured to execute link-up by executing a sequence of states that succeeds in setting a plurality of lanes to a plurality of ports, respectively,
wherein each memory is configured to store the sequence of states that succeeds as a reference sequence, respectively, and
wherein each of the first semiconductor device and the second semiconductor device changes at least one of the PHY parameters and determines whether link configuration is successful by comparing a sequence of states, executed by the LTSSM to configure a link, with the reference sequence.

20. The system of claim 19, wherein:
the reference sequence, stored in the memory of the first semiconductor device, is different from the reference sequence stored in the memory of the second semiconductor device.

* * * * *